(12) United States Patent
Loke et al.

(10) Patent No.: US 11,148,648 B2
(45) Date of Patent: Oct. 19, 2021

(54) HYDRAULIC UNIT FOR GENERATING BRAKE PRESSURE FOR A HYDRAULIC BRAKE SYSTEM

(71) Applicant: Continental Teves AG & Co. OHG, Frankfurt am Main (DE)

(72) Inventors: Jörg Loke, Brechen (DE); Horst Krämer, Ginsheim-Gustavsburg (DE); Manfred Rüffer, Sulzbach (DE); Andreas Bischoff, Frankfurt am Main (DE); Sascha Gerber, Bad Schwalbach (DE); Ingo Knewitz, Neu Anspach (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 16/870,337

(22) Filed: May 8, 2020

(65) Prior Publication Data

US 2020/0377068 A1 Dec. 3, 2020

Related U.S. Application Data

(63) Continuation of application No. PCT/EP2018/078044, filed on Oct. 15, 2018.

(30) Foreign Application Priority Data

Nov. 14, 2017 (DE) ...................... 10 2017 220 207.6

(51) Int. Cl.
*B60T 11/20* (2006.01)
*B60T 11/26* (2006.01)

(52) U.S. Cl.
CPC ............... *B60T 11/20* (2013.01); *B60T 11/26* (2013.01)

(58) Field of Classification Search
CPC ........... B60T 11/16; B60T 11/20; B60T 11/26
See application file for complete search history.

(56) References Cited

U.S. PATENT DOCUMENTS

| 4,276,994 A * | 7/1981 | Spalding | B60T 11/22 |
| | | | 164/98 |
| 5,131,144 A * | 7/1992 | Saalbach | B22D 25/02 |
| | | | 164/137 |

(Continued)

FOREIGN PATENT DOCUMENTS

| CN | 103619678 A | 3/2014 |
| DE | 102004057137 A1 | 8/2005 |

(Continued)

OTHER PUBLICATIONS

Herbert Fritz et al. "Fertigungstechnik 9", Norm VDG-Merkblatt K 200 2005-01-00. Gussteile für den Maschinenbau—Leitfaden für die Konstruktion und Bestellung von Gussteilen aus Gusseisen für den Maschinenbau. Titel + Seite 20, neu bearb. Aufl. Berlin: Springer, 2010. 396.-ISBN 978-3-642-12879-0.

(Continued)

*Primary Examiner* — Thomas E Lazo

(57) ABSTRACT

A hydraulic assembly for generating brake pressure for a hydraulic brake system, comprising a housing which is produced from a cast blank, having at least one receiving cavity for receiving a connector piece which is connected to a fluid container and which can be plugged along a plug-in axis (S) into the receiving cavity. The cast blank has, in the receiving cavity, at least one substantially planar surface, the normal vector (N) of which is oriented at an oblique inclination angle (W) with respect to the plug-in axis (S).

9 Claims, 1 Drawing Sheet

(56) References Cited

U.S. PATENT DOCUMENTS

| | | | | |
|---|---|---|---|---|
| 5,154,107 | A * | 10/1992 | Morin | B60T 11/20 |
| | | | | 92/13.3 |
| 6,012,288 | A * | 1/2000 | Gualdoni | B60T 11/16 |
| | | | | 29/888.06 |
| 6,935,112 | B2 * | 8/2005 | Koshimizu | B60T 11/236 |
| | | | | 60/588 |
| 8,578,711 | B2 * | 11/2013 | Yagi | B60T 11/232 |
| | | | | 60/591 |
| 9,657,753 | B2 * | 5/2017 | Luo | B60T 11/20 |
| 2011/0048226 | A1 | 3/2011 | Yagi et al. | |
| 2011/0133544 | A1 | 6/2011 | Ruopp | |
| 2014/0165554 | A1 | 6/2014 | Luo et al. | |
| 2018/0201247 | A1 * | 7/2018 | Koshimizu | B60T 11/20 |

FOREIGN PATENT DOCUMENTS

| | | |
|---|---|---|
| JP | H0537625 U | 5/1993 |
| WO | 2010/012439 A2 | 2/2010 |

OTHER PUBLICATIONS

Fachausschuss "Konstruieren in Guss", VDG-Merkblatt, "Gussteile fuer den Maschinenbau", K 200, Jan. 2005, Jan. 1, 2016 (Jan. 1, 2016), Seiten 20-20, XP055550257, Berlin ISBN: 978-1-5407-3194 Gefunden im internet: URL:https://www.bdguss.de/fileadmin/content bdguss/Der_BDG/Richtlinien/K_200.pdf Seite 20-Seite 20.
Search Report dated Oct. 25, 2018 from corresponding German Patent Application No. DE 10 2017 220 207.6.
International Search Report and Written Opinion dated Feb. 18, 2019 from corresponding International Patent Application No. PCT/EP2018/078044.

* cited by examiner

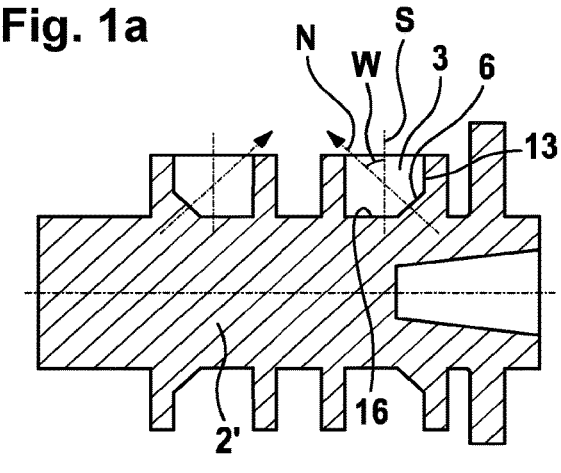
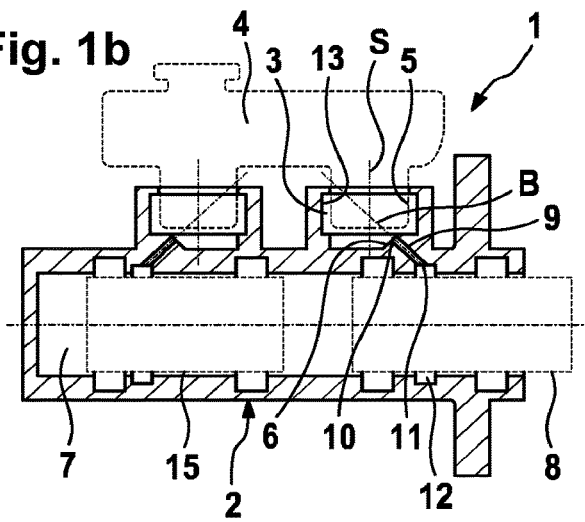
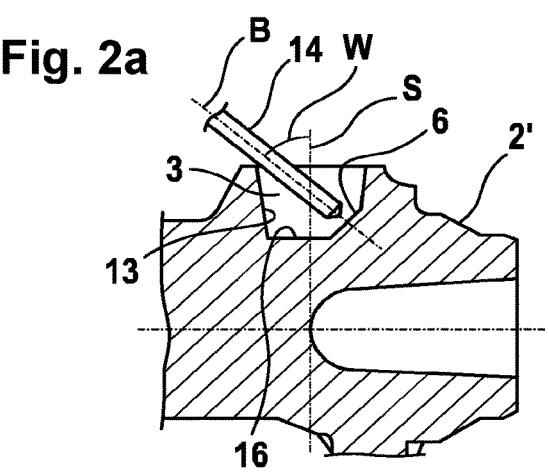
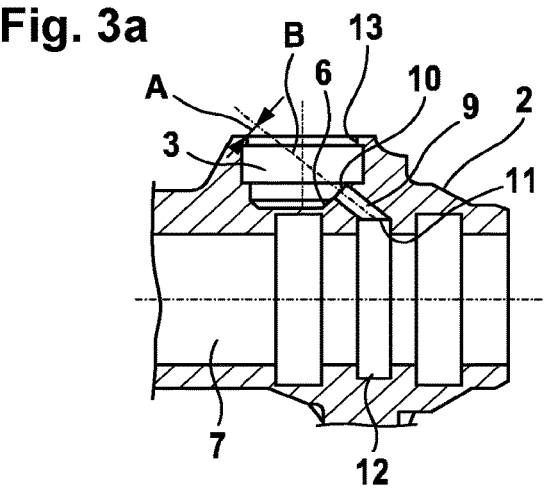
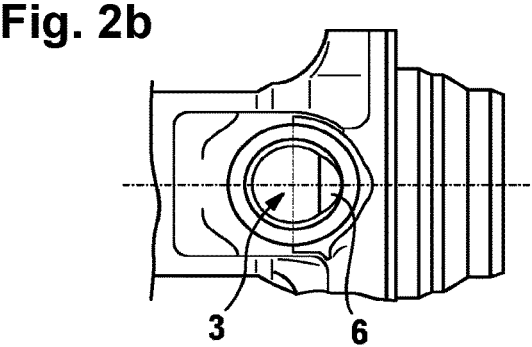
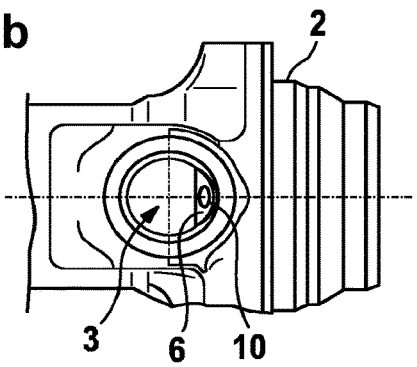

HYDRAULIC UNIT FOR GENERATING BRAKE PRESSURE FOR A HYDRAULIC BRAKE SYSTEM

CROSS REFERENCE TO RELATED APPLICATIONS

This application claims priority to PCT International Application No. PCT/EP2018/078044, filed Oct. 15, 2018, which claims priority to German Patent Application No. DE 10 2017 220 207.6, filed Nov. 14, 2017, wherein the contents of such applications are incorporated herein by reference.

TECHNICAL BACKGROUND

The housings of such assemblies are normally produced from light metal alloys. Here, it is commonly the case that a cast blank is firstly generated by primary forming—for example by permanent mold casting. A cast blank generated in this way initially has, owing to the production process, relatively coarse dimensional and surface tolerances and is thereafter provided with required functional elements, such as various ports, connecting channels, bores, sealing surfaces, grooves and the like, by means of machining methods, and is possibly subsequently provided with a protective layer.

Such functional elements have narrow tolerances and often place such high demands on the production tools and processes that the latter must be performed in multiple process steps. For example, it is common to firstly generate preliminary bores with coarse tolerances—so-called pilot bores—in order to provide an optimum contact surface for drilling tools for the generation of functional bores with narrow tolerances. The associated tool changes, which are associated with long residence times in the tool magazines, increase the production costs.

Obvious efforts to save weight and external dimensions additionally increase the precision requirements and production outlay and production costs.

What is needed is a hydraulic assembly which is improved and in particular optimized in terms of production technology.

BRIEF DESCRIPTION OF THE DRAWINGS

FIG. 1a shows, by way of example, not to scale and in highly simplified form, the housing of a hydraulic assembly according to the invention as an unprocessed cast blank.

FIG. 1b shows, by way of example, not to scale and in highly simplified form, the housing of a hydraulic assembly reworked with indicated further components, in axial section.

FIG. 2a shows an enlarged detail of the cast blank of an embodiment according to the invention in the region of the receiving cavity, in axial section.

FIG. 2b shows an enlarged detail of the cast blank of an embodiment according to the invention in the region of the receiving cavity, in plan view.

FIG. 3a shows a housing, reworked by machining, of the embodiment as per FIG. 2a.

FIG. 3b shows a housing, reworked by machining, of the embodiment as per FIG. 2b.

DETAILED DESCRIPTION OF THE DRAWINGS

FIG. 1 shows, in the view b, a housing 2, which has been equipped with further functional elements by machining, of an assembly 1, and, in the view a, the unprocessed cast blank 2' of said housing. In the embodiment shown, the hydraulic assembly 1 is designed as a master brake cylinder with primary piston 8 and secondary piston 15 arranged one behind the other in a tandem construction.

In the housing 2, there is arranged a piston bore 7 in which primary piston 8 (merely indicated here) and secondary piston 15 are guided in axially displaceable fashion. The lateral surface of the piston bore is equipped with multiple radial grooves. At least one radially inside groove 12 serves here for the uniform supply of brake fluid from a fluid container 4 so as to wet the primary piston 5, illustrated here representatively, in radially encircling fashion. For this purpose, the radially inside groove 12 is connected via a connecting bore 9 to the receiving cavity 3, into which a connector piece 5 hydraulically connected to the fluid container 4 is plugged along a plug-in axis S and sealed off by means of a sealing element (not shown here) which engages into undercuts of the inner lateral surface 13 of the receiving cavity 3.

On the cast blank 2', the inner lateral surface 13 of the receiving cavity 3 is initially provided so as to be substantially cylindrical, or conical owing to the required draft angles. A substantially planar surface 6 extends from the base 16 of the receiving cavity 3 into the lateral surface 13 thereof, the orthogonal or the normal vector N of which surface is inclined at an inclination angle W of approximately 45° with respect to the plug-in axis S. In one or more embodiments, the value of the inclination angle W may basically vary freely in a manner dependent on the design of the housing 2, though it has proven technically and economically particularly expedient to use a value range between 30° and 60°.

The surface 6 serves for the optimized contact of a tip of the drilling tool 14 that is used for drilling the connecting bore 9. The connecting bore 9 can thus be generated directly in the receiving cavity 3 of the cast blank 2', without the lateral surface 13 of the receiving cavity 3 having to be machined in any way beforehand, for example pre-drilled. Here, the inclination angle W of the surface 6 is selected such that the drilling tool 14 can engage directly on the surface 6 at a right angle in order to drive the connecting bore 9 as far as the outlet point 11 provided in the radially inside groove 12. In configuring the inclination angle W and the position of the inlet point 10 of the connecting bore 9, it must be ensured here that a minimum spacing A which is larger than a radius of the connecting bore 9 remains between the bore axis B and the inner lateral surface 13 of the receiving cavity 3, in order that the drilling tool 14 can run past, and does not make contact with, the upper edge of the receiving cavity 3.

After the production of the connecting bore 9, the piston bore 7, the radially inside groove 12 and the inside profile of the receiving cavity 3 are machined in the cast blank 2'. In one or more embodiments, the surface 6 is partially or completely removed in order to realize an enlarged plug-in depth for the connector piece 5.

The embodiments provide that the cast blank has, in the receiving cavity, at least one substantially planar surface, the normal vector of which is oriented at an oblique inclination angle with respect to the plug-in axis. According to the advantageous refinements, the inclination angle may lie in a range between 30° and 60°.

By means of a cast contour designed in this way, an optimized contact surface for a perpendicular seat of the drilling tool can be realized, such that the required connecting bore can be drilled directly while adhering to narrow tolerances, and an additional pilot bore can be omitted. Processing times and costs are significantly reduced as a result of the associated avoidance of tool changes.

In order to ensure the tool clearance, the embodiments provide that the bore axis runs with a minimum spacing, which is larger than a radius of the connecting bore, with respect to an inner lateral surface of the receiving cavity.

For an optimum, increased plug-in depth of the connector piece, the planar surface may, after the drilling of the connecting bore, be partially or completely removed by machining.

The embodiments can particularly advantageously be used in the case of the housing of a tandem master brake cylinder in order to realize a large axial offset, which promotes compactness, of the radially inside groove relative to the associated receiving cavity.

The embodiments furthermore include a hydraulic motor vehicle brake system which is equipped with a hydraulic assembly according to the embodiments.

LIST OF REFERENCE DESIGNATIONS

1 Hydraulic assembly
2 Housing
2' Cast blank
3 Receiving cavity
4 Fluid container
5 Connector piece
6 Surface
7 Piston bore
8 Primary piston
9 Connecting bore
10 Bore end
11 Bore end
12 Radially inside groove
13 Lateral surface
14 Drilling tool
15 Secondary piston
16 Base
A Minimum spacing
B Bore axis
S Plug-in axis
N Normal vector
W Inclination angle

The invention claimed is:

1. A hydraulic assembly for generating brake pressure for a hydraulic brake system, the hydraulic assembly comprising:
a housing which is produced from a cast blank, the housing having at least one receiving cavity formed by the cast blank for receiving a connector piece;
the connector piece connected to a fluid container, the connector piece connectable by being plugged along a plug-in axis (S) into the receiving cavity; and
wherein the cast blank has, in the receiving cavity, at least one substantially planar surface, the normal vector (N) of which is oriented at an oblique inclination angle (W) with respect to the plug-in axis (S).

2. The hydraulic assembly as claimed in claim 1, wherein the inclination angle (W) lies in a range between 30° and 60°.

3. The hydraulic assembly as claimed in claim 1, wherein the housing comprises at least one piston bore for receiving at least one primary piston and has a connecting bore with a bore axis (B), which connecting bore connects the receiving cavity to the piston bore, wherein an inlet point of the connecting bore opens out in the surface, and the bore axis (B) is oriented parallel to the normal vector (N).

4. The hydraulic assembly as claimed in claim 3, wherein an outlet point of the connecting bore opens into a radially inside groove which is arranged in a lateral surface of the piston bore.

5. The hydraulic assembly as claimed in claim 3, wherein the bore axis (B) runs with a minimum spacing (A), which is larger than a radius of the connecting bore, with respect to an inner lateral surface of the receiving cavity.

6. The hydraulic assembly as claimed in claim 3, wherein an inner lateral surface of the receiving cavity in the housing is subjected to machining at least in regions, and the connecting bore is formed in the cast blank prior to the machining of the lateral surface.

7. The hydraulic assembly as claimed in claim 6, wherein the surface in the receiving cavity is removed at least in regions by machining.

8. The hydraulic assembly as claimed in claim 1, wherein the surface is provided for orthogonal contact of a tip of a drilling tool.

9. The hydraulic assembly as claimed in claim 1, wherein the assembly is a master brake cylinder with primary piston and secondary piston arranged one behind the other in a tandem construction in a piston bore.

* * * * *